Patented May 31, 1949

2,471,875

UNITED STATES PATENT OFFICE 2,471,875

PROCESS OF MAKING STABILIZED JEL-TYPE HYDRATED LIME

Bruce E. Kester, Palatine, Ill., assignor to United States Gypsum Company, Chicago, Ill., a corporation of Illinois No Drawing. Application January 1, 1945, Serial No. 571,021

1 Claim. (Cl. 106—109)

The present invention relates to an improved form of hydrated lime capable upon admixture with water of forming a gel; and to methods of its preparation. The hydrated lime of the present invention is prepared by the addition of small amounts of carbon dioxide to the lime while the same contains but a small, critical amount of free moisture; and the amount of carbon dioxide contained in combined form in the end product is not over about 5% by weight. The resulting product is stabilized against aging by the addition thereto of certain soluble sulfates and, if desired, desiccating agents.

Lime hydrates, produced by the slaking of quicklimes, have been prepared by slaking or hydrating quicklime under various conditions as to temperature and relative amounts of water, etc. If an excess of water is used, there will result a more or less buttery mass of calcium hydroxide (or a mixture of calcium hydroxide and magnesium hydroxide if magnesium-containing or dolomitic lime has been used) which is of a nature that may be directly used by masons and plasterers. In order to assure its having the desired plasticity, it has been customary to store these so-called lime putties in order to let them develop the desired degree of plasticity. As this is time-consuming, a great demand has sprung up for the production of dry hydrated limes which would be capable, substantially immediately upon admixture with water, of forming a sufficiently plastic putty for use shortly after mixing. Accordingly, many processes have been published or patented leading to the production of immediately plastic dry hydrated limes. While the development of substantially immediate plasticity has been more or less satisfactorily attained, and dry hydrated limes are now on the market which will exhibit a plasticity in excess of 200, as measured on an Emley plasticimeter, within, say, fifteen minutes after mixing, yet many of these hydrated limes lack the property of proper hodding. For proper hodding, a hydrated lime putty should possess a certain amount of gelling properties, so that it will not tend to slump unduly when carried in a hod. Such gelling, however, should preferably be of a type which can be broken down by the plasterer during the application of the lime, or during the admixture of the gauging-plaster (calcined gypsum) therewith. In other words, even though a given hydrated lime may have a sufficiently high plasticity, it may still be deficient as to its gelling properties. These deficiencies the present invention is designed to overcome.

It is therefore one of the objects of the present invention to produce a hydrated lime product capable of forming a gel upon admixture with water.

A further object of the present invention is to produce a stable gelling lime hydrate by a process involving the carbonation of a substantially dry lime hydrate, containing from about 0.1 to about 1.0% of free moisture with some material capable of imparting combined carbon dioxide to the product in an amount not, however, exceeding about 5% by weight, and to stabilize the product by providing for the presence therein of soluble sulphates, and if desired, also some desiccant.

A further object of the invention is partially to carbonate a lime hydrate containing from about 0.1% to about 1.0% of free moisture with gaseous carbon dioxide under superatmospheric pressure until about 5%, at the most, of carbon dioxide, by weight, has combined with the lime hydrate, and to stabilize the product as already indicated.

Other objects of the invention, such as the production of a lime putty having gel-like properties, will become apparent from the further description of the invention hereinbelow.

One of the outstanding characteristics of the new hydrated lime product is its ability to form a gel strong enough to withstand the penetrating effect of a 12.5 mm. Vicat needle under a 30 gram thrust, when 100 grams of the product are mixed with even as much as 130 c. c. of water. The new product has a much higher consistency than hydrated lime products hitherto made. The gel produced by mixing the new product with water enables the product to be piled quite high in a hod, and yet will not slump down while being carried. However, upon gentle agitation, it will break down into a soft and smooth lime putty of excellent working characteristics.

The product of the present invention is prepared by subjecting hydrated lime, which may be either high-calcium lime or a dolomitic lime, in the dry state to the action of either gaseous carbon dioxide or a soluble carbonate or bicarbonate. While the lime is substantially dry when so treated, it is essential and critical that it contain at least 0.1% of moisture and not over about 1.0% of moisture, as it has been definitely ascertained that the presence of larger amounts of moisture during the carbonation is fatal to the production of the desired product. Below about 0.1% of free moisture is too low an amount to permit the formation of the product, and with more than about 1.0% of moisture the absorption of the carbon dioxide is an exothermic reaction that will lead to the formation of a product which does not have the desirable characteristics of the present invention. It has been found that between 0.2% and 0.3% of moisture is the most desirable for the production of a well-gelling hydrated lime product.

The amount of carbon dioxide which is thus caused to combine with the hydrated lime is also critical, and it has been definitely ascertained that when the amount of combined carbon dioxide exceeds about 5% that the product loses its gelling properties, and then has no decided advantages over prior art products, or over hydrated limes which have of their own accord absorbed carbon dioxide during storage. For best results, the amount of carbon dioxide added to the hydrated lime is about between two and three percent. Above 5% the effect is entirely lost. The amounts of moisture and carbon dioxide are therefore highly critical and cannot be disregarded.

The same end product can be obtained by the use of certain soluble carbonates, such, for example, as the carbonates and bicarbonates of the alkali metals and of ammonium; for instance sodium carbonate, sodium bicarbonate, potassium carbonate, potassium bicarbonate, and ammonium carbonates. When using these carbonates, the free moisture content of the hydrated lime must be between the already mentioned critical limits. The amount of the carbonates used may be between about 1% and 10%, but the amount of carbon dioxide which is caused to combine with the hydrated lime must also be on the order of between 1% and 5%; as above 5% the effect is substantially lost. An absolutely dry hydrated lime and a soluble carbonate will not react to produce the product of the present invention.

It is also important to note that the effect cannot at all be obtained by the expedient of mixing a soluble carbonate with the gauging water used for converting the hydrated lime into a putty, even though the correct relative amounts of hydrated lime and carbonate be employed. The presence of the large amount of water probably defeats the action. The same is true of aqueous solutions of carbon dioxide; nor can the effect be obtained by passing carbon dioxide into an aqueous suspension of hydrated lime. It thus appears that the results must be dependent upon the formation of some special type of calcium and magnesium sub-carbonates, and can not be accounted for by the production of mere mixtures of calcium and/or magnesium hydroxides and carbonates. Without wishing to be bound by any particular theory which might account for the effects obtained, it is suggested that compounds approaching basic carbonates are the result of the treatment. Whether the formation of these basic carbonates is confined to the surfaces of the individual hydrated lime particles is not known, but the behavior of the material makes it appear very likely that some such surface effect is involved; as the phenomenon is apparently one of colloid chemistry; such, for instance, as the formation of a film effect.

The partially carbonated product produced in the above-indicated manner may be mixed with the desired amount of water, say in the ratio of 125 parts of water to 100 parts of the product (by weight), and the resulting gelled putty then stored until required for use. It is quite stable if protected against evaporation losses, and is not stirred. The dry product, however, will remain stable only about 48 hours, particularly if it be kept in a damp atmosphere. It may, however, readily be stabilized by assuring the presence therein of a soluble sulphate, and can be still further stabilized by the presence of some desiccant, which will prevent the deterioration of the product due to absorption of moisture.

The labile nature of the carbonated product appears to be largely due to reversion of the desired carbonate state to calcium carbonate, the stable but inactive form of carbonation found commonly in aged or improperly manufactured hydrated limes. It has been found that a marked retardation of this reversion can be accomplished by the addition of a soluble sulphate compound. It has been found that various forms of calcium sulphate are sufficiently soluble effectively to retard this reversion. It has also been found that any of the common soluble salts of sulphuric acid are effective and roughly efficient in proportion to their solubility. Thus a highly soluble salt such as $MgSO_4.7H_2O$ is effective at lower concentration than calcium sulphate. It is also possible to use sulphuric acid as an additive to the hydrated lime prior to carbonation, this of course resulting in the formation of calcium sulphate in high calcium hydrates and in the formation of calcium and magnesium sulphates in dolomitic hydrates.

There are several means of accomplishing the desired admixture of soluble sulphate ion to the carbonated hydrated lime, and the invention is not limited to the particular method of insuring the presence of the stabilizing agents, but effective retardation of the reversion of the high consistency non-reversible gel-forming lime hydrate has been obtained by the following:

(a) A carbonated hydrated lime exhibiting the high consistency and gel character may be mechanically mixed with from 0.1% to 5% of a sulphate salt such as $MgSO_4.7H_2O$, $K_2SO_4$, or $CaSO_4.2H_2O$. This product has a remarkable stability as compared to the untreated carbonated hydrated lime.

(b) A hydrated lime may be mixed with from 0.1% to 3% of sulphuric acid by mechanical mixing and the subsequent product may then be carbonated. This product then has the desired stability.

(c) A hydrated lime may be prepared by hydrating the quicklime in a regular hydrator such as a Clyde or Schaffer, or in a pressure hydrator, where from 0.1% to 5% of a soluble sulphate salt is added during hydration. The subsequent product is then carbonated. This product has the desired stability. In this process it is preferred to use a form of calcium sulphate, usually in the raw gypsum state, of $CaSO_4.2H_2O$.

(d) A carbonated hydrated lime exhibiting the high consistency and gel character may be mechanically mixed with up to about 5% by weight of a soluble form of calcium sulphate known as soluble anhydrite. This method gives a carbonated hydrated sulphate-stabilized product which further has an admixed desiccant present, which minimizes aging due to excessive humidity. Commercially, rather than work with costly desiccating grades of soluble anhydrite, it is prefered to use either the forms of calcined gypsum called "second settle stucco" or "rotary calciner stucco," which are sufficiently pure forms of soluble anhydrite to act as desiccants as well as to retard the version of the carbonated hydrated lime. The soluble anhydrite thus performs the dual role of soluble sulphate as well as desiccant.

(e) A hydrated lime exhibiting the high consistency and gel character may be mechanically mixed with from 0.1% to 5% of a soluble sulphate and from 0.5% to 5.0% of an active desiccating agent. Quicklime (CaO or CaO.MgO) is a suitable type of desiccating agent. It is essential that the carbonation be accomplished before adding the desiccating agent. This is so, because a minimum of 0.1% of free water is required to be present in the hydrate to enable effective carbonation to take place. If the desiccating agent were to be added prior to carbonation, the required free moisture would be removed and the carbonation could not be properly accomplished.

It should be further noted that the addition of a soluble sulphate enhances the effectiveness of carbonating a hydrated lime. This is demonstrated by the increase in consistency noted when 5% stucco is present.

Examples of preferred methods for carrying out the process features of the present invention are as follows:

*Example 1. Gaseous carbonation of a dolomitic pressure-hydrated lime.*—A charge of dolomitic pressure-hydrated lime (made in accordance with well known methods in the lime industry, as for example, by hydrating the calcium oxide of a dolomitic burnt lime at atmospheric pressure, as in a Schaffer hydrator, and then hydrating the magnesium oxide under superatmospheric pressure and drying the resulting hydrated lime product) was placed in a suitable reaction chamber equipped with efficient mechanical stirrers. Pure dry carbon dioxide was then introduced for about one minute under a superatmospheric pressure of about two inches of mercury. The hydrated lime used contained between 0.1% and 1.0% of free moisture. The carbon dioxide was then drawn off and the product taken from the reaction chamber. It had not visibly changed in appearance. However, when 100 grams thereof were mixed with 125 c. c. of water, a stiff gel formed after only five minutes standing. The consistency of the partially carbonated material was much higher than that of the untreated lime, which had a consistency of about 100. An evaluation of the product, in comparison with the untreated lime, is shown in the following Table I:

*Table I*

| | Blank | $CO_2$ Treated Sample |
|---|---|---|
| Water: Lime Ratio | 100:100 | 125:100. |
| Vicat penetration, 12.5 mm. needle, weighted with 30 grams. | 24 mm | No penetration; stiff gel formed. |
| Penetration after remixing | 25 mm | 22 mm.; gel broken down. |

The product which had been treated with the carbon dioxide produced a satiny-smooth grain-free putty in contrast with a grainy putty produced from the untreated hydrate. It can be stabilized as described hereinbelow, (Example 5).

*Example 2. Soluble carbonate treatment of a dolomitic pressure-hydrated lime.*—A charge of the same hydrated lime, as used for Example I, was treated in the same mechanical mixer, but without pressure, by mixing with the hydrated lime 3% by weight of dry anhydrous sodium carbonate ($Na_2CO_3$), the materials being thoroughly mixed.

On mixing the resulting product with water in the same proportions as shown in Example 1, the results obtained were as shown in Table II.

*Table II*

| | Blank | Carbonate Treated Product |
|---|---|---|
| Water: Lime Ratio | 100:100 | 125:100. |
| Vicat Penetration, 12.5 mm. needle weighted with 30 grams. | 24 mm | No penetration; stiff gel formed. |
| Penetration after remixing | 25 mm | 23 mm.; gel broken down. |

*Example 3. Gaseous carbonation of a high-calcium hydrated lime.*—A suitably hydrated Clyde high-calcium lime, containing less than 1.0% of free moisture, was treated exactly as described in Example 1, with gaseous carbon dioxide. The product obtained contained 0.4% of free water and 2.20% of combined $CO_2$. The properties of the product were as shown in Table III.

*Table III*

| | Blank | $CO_2$ Treated Product |
|---|---|---|
| Water: Lime Ratio | 100:100 | 150:100. |
| Vicat penetration, 12.5 mm. needle weighted with 30 grams. | 18 mm | No penetration; stiff gel formed. |
| Penetration after remixing | 19 mm | 18 mm.; gel broken down. |

It will be noted that the high-calcium carbonated hydrate had even a higher consistency than the dolomitic carbonated hydrate; but otherwise the advantages of gel formation were as much in evidence as before. Here also the gel broke down on remixing; which is a most desirable property, and appears to be quite unique, so as to enable smooth putties to be prepared.

Generally speaking, the physical properties of the products obtained in accordance with the present invention are obviously quite different from those of the usual dry hydrated limes. The first quickly appreciated change is the remarkable increase in consistency, the carbonated hydrates requiring anywhere from 20 to 60 parts more of water than the uncarbonated materials. This higher consistency also produces a higher volume of yield from a given weight of hydrated lime, which is also desirable. Soon after mixing with the required amount of water the product forms a stiff gel which can best be evaluated by means of the Vicat needle testing apparatus. Even as soon as five minutes after mixing, the gel will support a 12.5 mm. Vicat needle weighted with a 30 gram weight without any noticeable penetration; thus showing the remarkable gel strength of the material. If the gel be agitated, however, it quickly breaks down into a very smooth putty, and this will not again gel up. The product is thus not thixotropic. An interesting phenomenon is that the product has no higher Emley plasticity than that of the uncarbonated material, so the effect cannot be explained on the basis of plasticity.

*Example 4. Uses of the product and preparation of lime putties.*—Present practice in the plastering trade for the use of hydrated lime largely falls into two methods. One method is to soak a large amount of hydrated lime, say from 400 to 1000 pounds, in a large deep tank. The tank may be partly filled with water and the lime dumped in, or the water may run into a tank containing the dry hydrated lime. After what is judged to be the proper amount of water has been added, the putty is allowed to stand for from 16 to 24 hours. Putties so prepared are characterized by lack of uniformity, the material on the bottom of the tank being thin and watery; that in the top dry and grainy; the middle third of the material being the only desirable portion. However, the entire batch is used, with the occasional exception of removal of the top crust which is often exceptionally lumpy and grainy. The material is shoveled from the tank onto a V-shaped tool called a hod. Owing to the lack of gel formation the putty is difficult to shovel and slumps badly when placed on the hod and when the hod is carried. The putty is transferred from the hod to a large square board for mixing with gauging plaster (calcium sulfate hemihydrate). Here the plasterer must spend considerable time working the putty to remove lumps and grains, and when using material from the bottom of the tank he is forced to use excessive amounts of the gauging plaster to dry up the watery mass. When working on putty from the top of the tank he must add more water, and/or use insufficient gauging plaster to produce a workable finish.

The second method is to mix with water one or two bags of dry hydrate in a large flat box. The dry hydrate is dumped into a box and water added. The two are then hoed until a uniform mixture is obtained. Since if the material was mixed thin it would require excessive amounts of gauging plaster, it is mixed as near as possible to normal application consistency. In the first part of the mixing operaton this results in a stiff rubbery mass which is difficult to mix. A putty so made contains numerous lumps and grains, and the lack of gelling properties makes it difficult to carry on a hod.

When using a partially carbonated lime made in accordance with the present invention, one proceeds as follows:

To a mechanical mixer containing about 130 parts of water for each 100 parts of hydrated lime to be mixed, add the lime with the mixer in motion. Mix for a short time, say about 2 minutes, and dump the mix into a mortar box or tank. During this mixing and dumping the lime and water will form a slurry of about the consistency of heavy cream. Shortly after dumping, i. e., within about 5 to 10 minutes, the whole batch gels. Subsequent mixes can be made and dumped on top of the first mix, and each in turn will form the desirable gel. This putty can then be cut sharply with a shovel, piled high on a hod without slumping and when placed on the gauging board is readily broken to application consistency with no graininess or hard lumps present, and of constant and uniform water content. This of course means that the plasterer does not have to adjust either the amount of water or the amount of gauging plaster, but that all batches will be uniform and alike. Obviously the resultant wall finish will be more uniform than where variations in gauging and water are encountered as in normal practice. The resultant wall finish will be free from blemishes and scratches.

While the carbonation by means of gaseous carbon dioxide works well under pressure, the amount of such pressure is not critical, and, as a generality, the percentage of carbon dioxide absorbed in a given time is substantially a linear function of the pressure. As to consistency, this appears to be roughly inversely proportional to the amount of $CO_2$ taken up by the material, the best results being at about 2% of $CO_2$. As to the time required for the absorption of the carbon dioxide, this seems to show an advantageous period at about 10 minutes, the curve rapidly flattening above that time period. The operation can thus be seen as being quite rapid, and limited only within the critical ranges already hereinabove indicated.

The apparatus employed for carrying out the carbonation is of a type well known in the industry, and hence requires no detailed discussion or illustration.

As already briefly mentioned, the products obtained in accordance with Examples 1 through 3, while possessing the desirable gelling properties, are not stable upon storage. They are, however, rendered stable in accordance with any one of the methods herein enumerated under items (a) through (e), supra. The method of providing for the presence of the soluble sulphate and the desiccants, merely involve the use of efficient dry-mixing equipment. It should be remembered that in the case of the use of calcium sulphate in the soluble anhydrite form that this serves both as the soluble sulphate as well as the desiccant.

*Example 5. Stabilization procedure.*—As an illustration of the stabilizing effects of a soluble sulphate, a carbonated pressure-hydrated dolomitic lime, prepared as hereinabove described in Example 1, was mechanically admixed with 2% by weight of magnesium sulphate ($MgSO_4.7H_2O$) in the manner also hereinafter described under item (a). Tests were then conducted under varying storage conditions, in which the product of Example 1 was compared with the product of Example 1 to which the magnesium sulphate had been added as a stabilizer. The results were as shown in subjoined Table IV.

*Table IV*

[12.5 mm. Vicat needle penetration with 30 gram weight at 130 c. c. consistency under storage conditions as indicated below]

| Time of Storage | Unstabilized Carbonated Hydrate | | | Carbonated Hydrate Stabilized with 2% $MgSO_4.7H_2O$ | |
|---|---|---|---|---|---|
| | Sealed | Paper Bag Room Temp. | High Humidity | Paper Bag Room Temp. | High Humidity |
| At start | 0 mm | 0 mm | 0 mm | 0 mm | 0 mm |
| 2 hrs | 0 mm | 0 mm | 0 mm | 0 mm | 0 mm |
| 6 hrs | 0 mm | 0 mm | 20 mm | 0 mm | 0 mm |
| 48 hrs | 0 mm | 0 mm | through [1] | 0 mm | 0 mm |
| 5 days | 10 mm | 20 mm | do | 0 mm | 3 mm |
| 14 days | through | through | do | 0 mm | 10 mm |
| 90 days | do | do | do | 0 mm | 20 mm |
| 120 days | do | do | do | 8 mm | through |

[1] The term through indicates that the Vicat needle had completely penetrated the sample.

*Example 6. Stabilization by means of calcium sulphate.*—Five per cent of gypsum landplaster was added to an autoclave charge of normal dolomitic hydrate. The normal hydrate was completely hydrated under 170 pounds steam pressure, which action calcined the gypsum to the hemihydrate; such calcination is incidental to the process and is not required to make the process operative. The resulting product was then carbonated to a high consistency gel-forming hydrated lime, as indicated in Example 1, supra. The product even after 6 months storage still had a zero penetration of the Vicat needle at 130 cc. consistency. The product of Example 1, however, when stored in paper bags at room conditions lost its gel character in 5 days.

*Example 7. Stabilization with a desiccant.*—A portion of the material from Example 6 was mixed with 2% calcium oxide and stored under high humidity conditions. The material without the calcium oxide had lost its properties of high consistency and gel character in 90 days, but the material to which calcium oxide had been added retained its high consistency and gel strength for 120 days and at 6 months its gelling qualities had dropped to a point where at 130 cc. consistency the 30 gram Vicat needle penetrated to a 20 mm. depth.

Relative to the use of desiccants, calcium sulphate anhydrite and calcium oxide have already been described in detail. However, these constitute the preferred embodiments of the invention. Other suitable desiccants may, however, be substituted therefor, with varying results. Examples of such desiccants are: phosphorus pentoxide, calcium chloride, barium oxide, silica gel, etc.

While magnesium and calcium sulphates have been specifically mentioned, any other soluble sulphate may be used instead, as for instance the sulphates of hydrogen, of the alkali metals, of ammonium, and water-soluble sulphates such as those of aluminum, copper, nickel, chromium, cobalt, zinc, manganese, or organic sulphates such as those of the aliphatic and aromatic amines, and sulphates of the organic radicals.

The entire process, therefore, comprises the carbonation of any form of hydrated lime under conditions where the said lime has a moisture content of between about 0.1% and 1.0% to an extent to impart thereto a combined carbon dioxide content of from about 1% to about 5%, irrespective as to whether this has been accomplished by means of carbon dioxide or by means of a carbonate or a bicarbonate, and also involves the incorporation therewith of a suitable soluble sulphate and/or a desiccant. If the soluble sulphate is a form of calcium sulphate soluble anhydrite, this will also act as a desiccant.

The invention herein described thus makes it possible to provide the plasterer with a particularly desirable form of dry hydrated lime, which, on simple mixing with water, will yield within a few minutes a gel-like product that lends itself particularly well to admixture with further quantities of materials, such as gauging plaster (calcium sulphate hemihydrate), and which breaks down on gentle agitation into a smooth grainless lime putty of excellent properties.

It will of course be understood that the development of the high strength gel at a consistency of 130 cc., which lends to the new product the great increase in hoddability and lack of slumping characteristics, is something entirely different from the development of a so-called "set" in a lime product. The gelled product has not set in any sense of the word, but has merely temporarily combined with the water to form a colloidal condition known as a gel.

The apparatus required for performing the mixing operations is simple and well known in the cement, lime, and plaster industries, and therefore requires no illustration or further description. It will therefore be understood that applicant is not to be limited by the precise methods of carbonation and mixing herein described, but that his invention is to be construed as coming within the general scope and purview of his hereunto appended claim in which applicant claims as new:

Process of producing a storage-stable hydrated lime product of high immediate plasticity and capable of rapidly forming a substantially non-slumping gel on admixture with water which comprises mixing about 5% of calcium sulfate dihydrate with a dolomitic lime hydrate in which the calcium oxide has been hydrated, pressure-hydrating the resulting mixture under steam pressure to hydrate the magnesium oxide component thereof and to convert the dihydrate into soluble anhydride; drying the resulting product to a moisture content of between about 0.1% and about 1.0% and carbonating the same with a substance selected from the group consisting of carbon dioxide and soluble carbonates and bicarbonates to an extent to impart thereto a combined carbon dioxide content not exceeding about 5% by weight of the carbonated product.

BRUCE E. KESTER.

REFERENCES CITED

The following references are of record in the file of this patent:

UNITED STATES PATENTS

| Number | Name | Date |
|---|---|---|
| 460,697 | Wright | Oct. 6, 1891 |
| 683,188 | Spear | Sept. 24, 1901 |
| 1,604,574 | Holmes et al. | Oct. 26, 1926 |
| 1,604,575 | Holmes et al. | Oct. 26, 1926 |
| 1,604,576 | Mathews et al. | Oct. 26, 1926 |
| 1,634,459 | Gerlach | July 5, 1927 |
| 1,732,409 | Loomis et al. | Oct. 22, 1929 |
| 1,912,883 | Blank | June 6, 1933 |
| 2,193,391 | Carson | Mar. 12, 1940 |
| 2,423,335 | Minnick | July 1, 1947 |

FOREIGN PATENTS

| Number | Country | Date |
|---|---|---|
| 10,130 | Great Britain | 1914 |

Certificate of Correction

Patent No. 2,471,875.  May 31, 1949.

BRUCE E. KESTER

It is hereby certified that errors appear in the above numbered patent requiring correction as follows:

In the grant, line 6, and in the heading to the printed specification, line 3, for "JEL-TYPE", read *GEL-TYPE*; column 4, line 72, for "version" read *reversion*; column 8, line 50, for the word "hereinafter" read *hereinabove*; column 10, line 55, list of references cited, for "Mathews" read *Mathers*;

and that the said Letters Patent should be read with these corrections therein that the same may conform to the record of the case in the Patent Office.

Signed and sealed this 22nd day of November, A. D. 1949.

[SEAL]

THOMAS F. MURPHY,
*Assistant Commissioner of Patents.*